United States Patent [19]

Welty

[11] 4,368,419

[45] Jan. 11, 1983

[54] POWER SUPPLY AND METHOD UTILIZING APPLIED CURRENT FOR INCREASED HYSTERESIS SWING IN TRANSFORMER CORE

[75] Inventor: Joseph M. Welty, Hayward, Calif.

[73] Assignee: Branson International Plasma Corporation, Hayward, Calif.

[21] Appl. No.: 243,738

[22] Filed: Mar. 16, 1981

Related U.S. Application Data

[63] Continuation of Ser. No. 48,010, Jun. 13, 1979, abandoned.

[51] Int. Cl.$^3$ ............................................. G05F 1/455
[52] U.S. Cl. ................................. 323/239; 323/324; 363/86
[58] Field of Search ..................... 363/21, 26, 75–88, 363/90–93, 20; 307/12, 17; 323/239, 324, 329

[56] References Cited

U.S. PATENT DOCUMENTS

| 3,518,526 | 6/1970 | Genuit | 363/20 |
| 3,921,054 | 11/1975 | Heinicke | 363/27 |
| 3,935,526 | 1/1976 | Kamata et al. | 363/21 |
| 4,017,786 | 4/1977 | Jensen | 363/134 |
| 4,051,425 | 9/1977 | Smith | 363/86 |

OTHER PUBLICATIONS

Electronic Design 8, vol. 25, pp. 110–115, Apr. 1977.

Primary Examiner—William H. Beha, Jr.
Attorney, Agent, or Firm—Flehr, Hohbach, Test, Albritton & Herbert

[57] ABSTRACT

Power supply and method in which the primary current to a transformer is switched on and off to maintain the output of the supply at a desired level. When the energizing current is off, an additional current is applied to the transformer to maintain the core at a level of magnetization such that the full hysteresis characteristic of the transformer is utilized during the next half cycle of operation.

6 Claims, 3 Drawing Figures

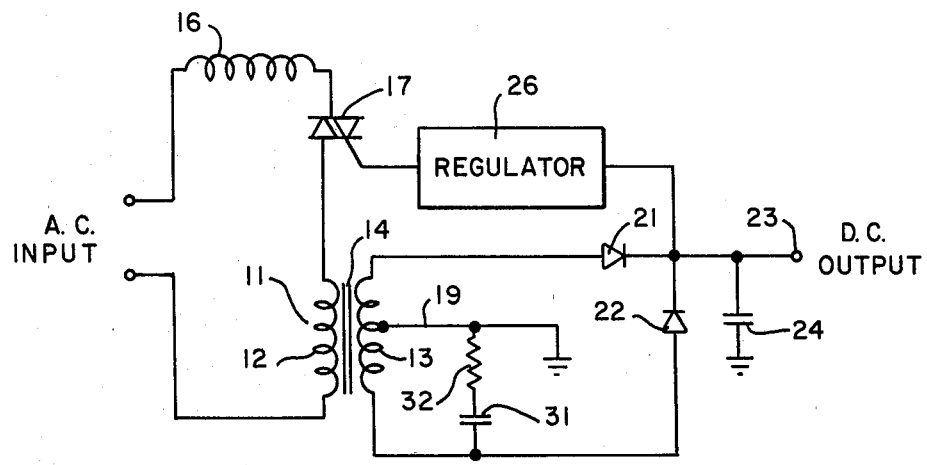
FIG.—1
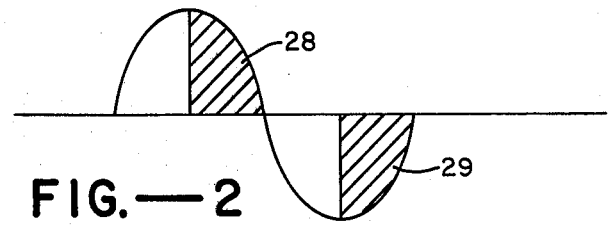
FIG.—2
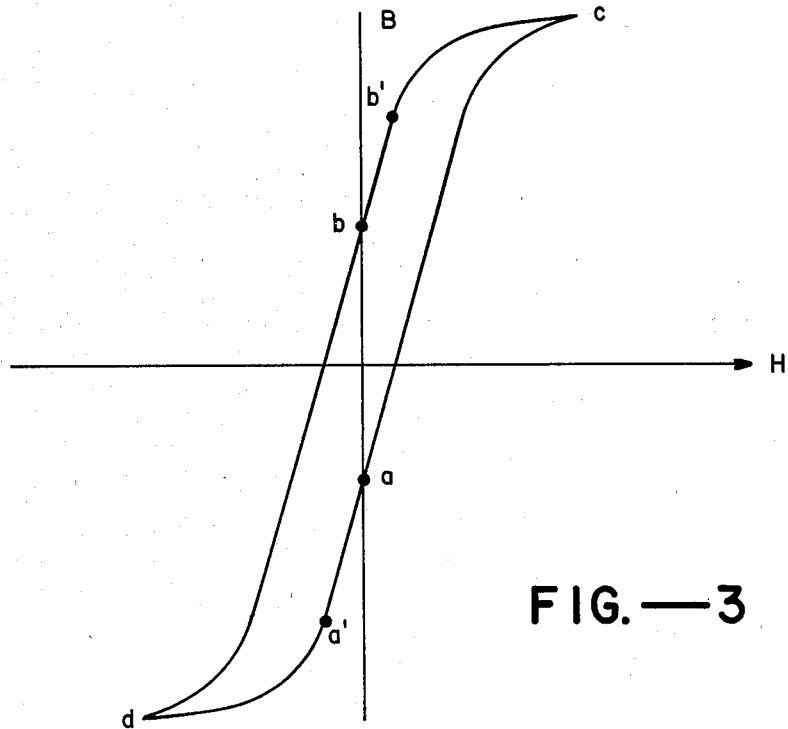
FIG.—3

POWER SUPPLY AND METHOD UTILIZING APPLIED CURRENT FOR INCREASED HYSTERESIS SWING IN TRANSFORMER CORE

This is a continuation of application Ser. No. 048,010 filed June 13, 1979, now abandoned.

This invention pertains generally to electrical power supplies and more particularly to a power supply of the type in which the primary current in a transformer is switched on and off to effect regulation of the output voltage.

Many electronic circuits and systems require D.C. supply voltages which are relatively stable even though the source voltage and/or the load imposed on the system may vary. Often the power source is an alternating voltage source, either single phase or three phase. One simple D.C. supply for use with a single phase A.C. voltage comprises a diode rectifier in combination with a capacitive filter. The rectifier can be a half wave, full wave or bridge configuration, and it is usually coupled to the A.C. source through a transformer. Unfortunately, this simple D.C. supply is susceptible to variations both in the A.C. source voltage and in the load connected to the supply.

Voltage regulators are often employed to reduce the effect of variations in the A.C. input voltage on the D.C. output voltage. A "switching regulator", for example, senses the output voltage and switches the input current on and off with a duty cycle which will maintain the output voltage at the desired level. While such regulators provide a definite improvement in the stability of the output voltage, they cause the transformer in the power supply to operate inefficiently in that only a limited portion of the hysteresis curve of the transformer is utilized during each half cycle of the input current. This requires the transformer to have a larger core than would otherwise be required.

It is in general an object of the invention to provide a new and improved power supply and method utilizing a greater portion of the hysteresis curve so that the transformer can operate more efficiently.

Another object of the invention is to provide a power supply and method of the above character in which an additional magnetizing current is applied to the transformer to maintain the core at a predetermined level of magnetization when the primary current is turned off.

Another object of the invention is to provide a power supply and method of the above character utilizing a smaller transformer than comparable power supplies of the prior art.

These and other objects are achieved in accordance with the invention by providing a transformer having a core of magnetizable material, with regulator means for varying the duty cycle of energizing current applied to the transformer by switching the current on and off periodically so that the current is delivered to the transformer only during a limited portion of each half cycle of the current. An additional current is applied to the transformer to maintain the core in a predetermined state of magnetization during the interval between successive applications of the energizing current so that a greater portion of the hysteresis curve is utilized.

FIG. 1 is a circuit diagram of one embodiment of a power supply incorporating the invention.

FIG. 2 is a graphical representation of the input voltage wave form, illustrating the operation of the voltage regulator in the embodiment of FIG. 1.

FIG. 3 is a graphical representation of the hysteresis curve of the transformer in the embodiment of FIG. 1.

As illustrated in FIG. 1, the power supply comprises a transformer 11 having a primary winding 12, a secondary winding 13, and a core 14 of magnetizable material such as iron.

Energizing current is applied to the transformer from an A.C. source through an inductor 16 and a triac 17 connected in series with the primary winding. The inductor serves to limit the instantaneous current amplitude in the primary circuit, and the triac serves as a switch for turning the primary current on and off to effect regulation of the output voltage as discussed more fully hereinafter.

The secondary winding of the transformer has a center tap 19 which is connected to ground, and diodes 21, 22 are connected between the ends of the secondary winding and an output terminal 23 to form a full wave rectifier. It will be understood, however, that any other suitable rectifier can be employed, e.g. a half wave rectifier or a bridge rectifier. A filter capacitor 24 is connected between the output terminal and ground.

A voltage regulator 26 senses the voltage at the output terminal and applies a control signal to the control gate of triac 17 to maintain the voltage at the output terminal at a desired level. Regulator 26 and triac 17 form what is sometimes referred to as a "switching regulator", and the operation of this circuit can best be understood with reference to FIG. 2. The regulator turns the triac on during the second and fourth quadrants of each cycle of the energizing current, as illustrated by shaded areas 28, 29 in FIG. 2. If the regulator senses that the output voltage is too low, the triac is turned on at an earlier point in the cycle, and if the output voltage is too high, the triac is turned on at a later point. Thus, the regulator and triac adjust the duty cycle of the primary current to maintain the output voltage at the desired level.

Means is provided for applying an additional current to the transformer during the intervals when the primary current is off to maintain the core in a state of magnetization such that the transformer operates over a greater portion of its hysteresis curve than it otherwise would. This means includes a capacitor 31 and a resistor 32 connected in series across a portion of the secondary winding of the transformer. When the primary current is on, the capacitor is charged with current from the secondary winding, and when the primary current is off, the capacitor delivers current back to the winding. The resistor in series with the capacitor prevents the capacitor from discharging too rapidly and insures that the current supplied by the capacitor is maintained throughout the interval when the primary current is turned off. In a typical supply with a secondary voltage of 350 volts, for example, capacitor 31 can have a value of 4 microfarads, and resistor 32 can have a value of 350 ohms. In the embodiment illustrated, the transformer has a single secondary winding, and the magnetizing capacitor is connected across one half of this winding. The invention can, of course, be utilized with transformers having any number of windings, and the capacitor can be connected across all or part of any of the windings. To reduce the size of the capacitor required, however, it is preferable to connect the capacitor to a relatively low voltage winding. Thus, for example, with a transformer having a 220 volt primary winding, a 3500 volt secondary winding, and two 350 volt secondary windings, the capacitor is advantageously connected to one of the 350 volt windings.

Operation and use of the power supply and therein the method of the invention can best be described with reference to FIG. 3. This figure shows the relationship between the magnetizing force H, which is a function of the primary current, and the magnetization or flux density B of the core. The current induced in the secondary winding is, of course, a function of the flux density. Without capacitor 31 and resistor 32, each cycle would begin near the center of the hysteresis curve at either point a or point b, depending upon the polarity of the energizing current during the previous half cycle. For a positive half cycle, for example, the magnetization level would start at point a and increase to point c when the triac is turned on. When the sinusoidal energizing current reaches zero and the triac turns off at the end of the positive half cycle, the magnetization of the core would fall to the level of point b. During the next half cycle, the magnetization level would move to a point d when the triac is turned on and return to point a when the triac is turned off. Operating in this manner, the transformer utilizes only a portion of the hysteresis curve, and the response of the transformer is limited accordingly.

With capacitor 31 and resistor 32 connected to the secondary winding, capacitor 31 receives charge during the active portion of each half cycle, i.e. when the triac is turned on. When the triac is turned off, the capacitor supplies current to the secondary winding and thereby maintains the core at a greater level of magnetization then is possible without the additional current. For a positive half cycle, the magnetization level of the core begins at point a', then moves to point c and falls back to point b'. For a negative half cycle, the magnetization level begins at point b', then moves to point d and falls back to point a'. Points a' and b' are located farther from the origin or center of the hysteresis curve than are points a and b, and the transformer operates over a greater portion of the curve for each half cycle. The increased swing or utilization of the hysteresis characteristic makes it possible to obtain a desired response with a smaller core. For a given power supply utilizing the invention, the transformer typically needs only about two-thirds of the iron which would be required without the capacitor.

It is apparent that a new and improved power supply and method have been provided. While only certain presently preferred embodiments have been described in detail, as will be apparent to those familiar with the art, certain changes and modifications can be made without departing from the scope of the invention as defined by the following claims.

What is claimed is:

1. In a method of operating a power supply having a transformer with a core of magnetizable material energized by an alternating current which is interrupted for a period of time during each half cycle thereof to regulate the output of the supply, the magnetization of said core being driven between maximum levels of opposite polarity during alternate half cycles of the energizing current, applying an additional current to the transformer during the periods of interrupted energizing current to maintain the core near the maximum level of magnetization to which it is driven during each half cycle so that the magnetization swings from near the maximum of one polarity to the maximum of the other polarity during each half cycle of the energizing current.

2. The method of claim 1 wherein the additional current is supplied by a capacitor connected to a winding of the transformer.

3. In a power supply: a transformer having a core with a state of magnetization which is driven between maximum levels of opposite polarity during alternate half cycles of an energizing current applied to the transformer from an alternating current source, means connected between the source and the transformer for regulating the output of the supply by interrupting the application of the energizing current for a period of time during each half cycle thereof to maintain the output at a predetermined level, and means connected to the transformer for applying an additional current to the transformer during the periods of interrupted energizing current to maintain the magnetization of the core near the maximum level to which it is driven during each half cycle and thereby maximize the swings of the magnetization during the succeeding half cycle.

4. The power supply of claim 3 wherein the means for applying an additional current comprises a capacitor connected electrically in parallel with a winding on the transformer.

5. The power supply of claim 4 further including a resistor connected electrically in series with the capacitor, said resistor and capacitor together being connected in parallel with the transformer winding.

6. In a power supply: a transformer having primary and secondary windings and a core of magnetizable material with a magnetization characteristic which is driven between maximum levels of opposite polarity during alternate half cycles of an energizing current from an alternating current source, regulator means for sensing the output of the supply and interrupting the application of the energizing current to the primary winding for a period of time during each half cycle of said current to maintain the output at a predetermined level, and means including a capacitor connected to the secondary winding for receiving current from the secondary winding when the energizing current is applied and supplying current to the secondary winding when the energizing current is interrupted to maintain the core near the maximum level of magnetization to which is driven during each half cycle.

* * * * *